United States Patent [19]
Kirchen et al.

[11] Patent Number: 5,797,496
[45] Date of Patent: Aug. 25, 1998

[54] METHOD FOR THE UTILIZATION OF ASH FROM COAL-FIRED PLANTS

[75] Inventors: Gunther Kirchen, Wurselen; Jurgen Lehrke, Herzogenrath, both of Germany

[73] Assignees: Sicowa Verfahrenstechnik Fur Baustoffe GmbH & Co., KG, Aachen, Germany; ProMineral Gesellschaft Zur Verwendung von Mineralstoffen mbH, Bergheim, Germany

[21] Appl. No.: 733,703

[22] Filed: Oct. 17, 1996

[30] Foreign Application Priority Data

Oct. 18, 1995 [DE] Germany .................. 195 38 710.4

[51] Int. Cl.$^6$ .................................................. B03B 9/00
[52] U.S. Cl. .............................. 209/2; 209/12.1; 209/38
[58] Field of Search .................................. 209/2, 12.1, 38

[56] References Cited

U.S. PATENT DOCUMENTS

| | | | |
|---|---|---|---|
| 3,769,054 | 10/1973 | Pennachetti et al. | 209/38 X |
| 4,669,397 | 6/1987 | Galgana et al. | 209/38 X |
| 4,804,147 | 2/1989 | Hooper | 209/38 X |

*Primary Examiner*—David H. Bollinger
*Attorney, Agent, or Firm*—Cushman Darby & Cushman

[57] ABSTRACT

A method for the utilization of ash from coal-fired plants, in which open-pass ash is drawn off when it is dry for further use. According to one embodiment of the invention, the open-pass ash is used as a raw material and fuel in cement production. According to another embodiment, the open-pass ash is used as bed sand with combustible constituents in fluidized-bed firing. According to still another embodiment, the ash is used for the purpose of influencing sinterability in the production of sintered lightweight aggregates. The mineral constituents can be separated from carbon-containing constituents, which are capable of being used as fuel or activated coke, and used as fine sand in any of these embodiments.

16 Claims, 1 Drawing Sheet

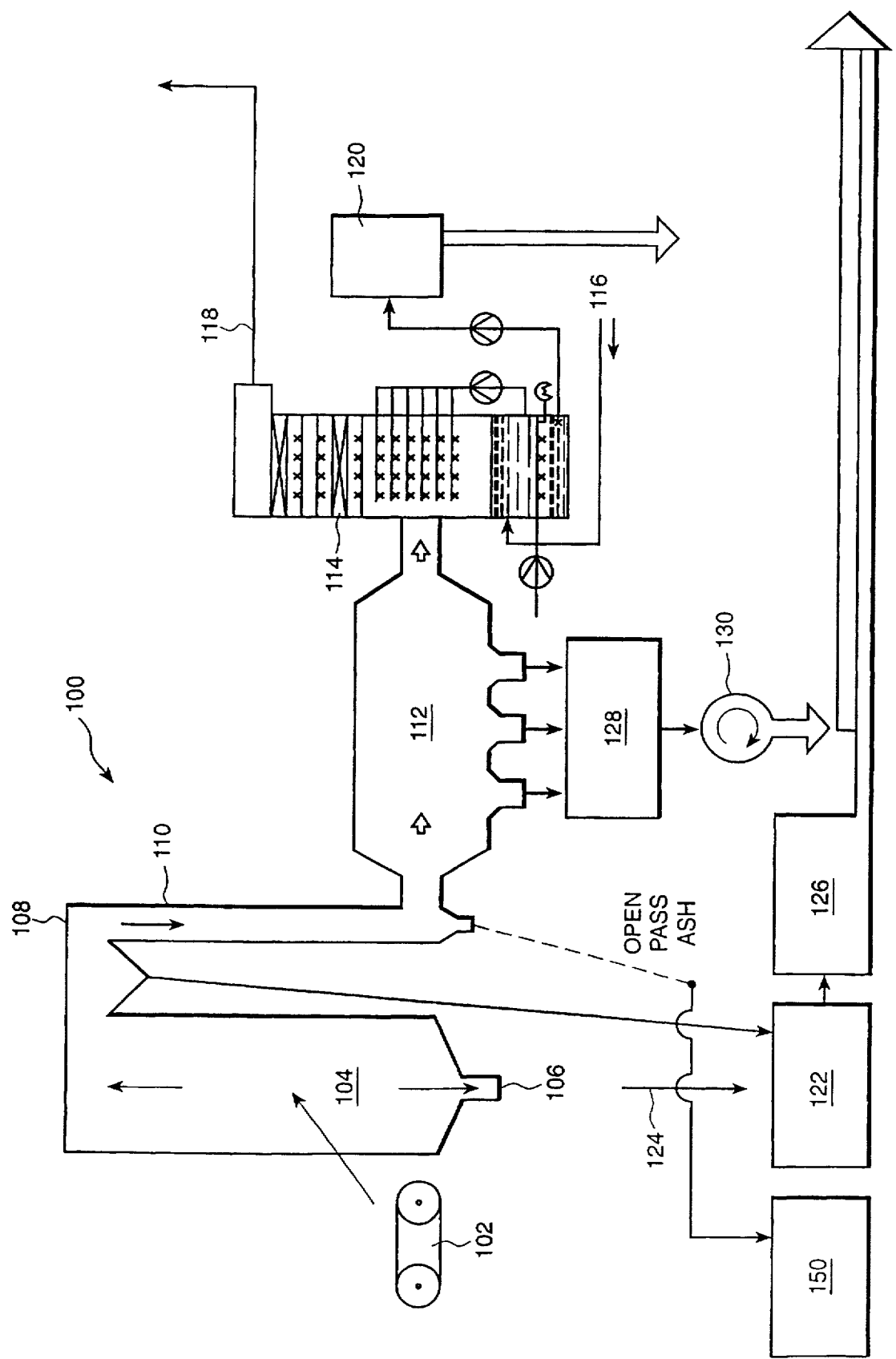

METHOD FOR THE UTILIZATION OF ASH FROM COAL-FIRED PLANTS

BACKGROUND OF THE INVENTION

1. Field of the Invention

The invention relates to a method for the utilization of ash from coal-fired plants.

2. Description of the Related Art

In general, coal-fired (brown coal) and lignite-fired power station boilers are designed in such a way that, in the radiation part (the combustion chamber), relatively coarse non-combustible constituents, together with unburned particles of coal or coke, are intercepted as so-called wet ash or boiler sand in a water bath located underneath the radiation part, while a flue gas is conducted via contact heating surfaces, so as to emit further heat, to electrostatic or cloth filters, where the fine dust is separated as so-called filter ash.

Relatively coarse-grained ashes occur in the boiler parts and flue-gas conduits which are arranged between the combustion chamber and dust filter. These parts and conduits include a cross pass, open pass, second and third pass, and air-preheating pass. The ashes conveyed through these passes and are hereafter referred to as a whole as open-pass ash. These ashes are conducted via conveying conduits, for cooling, into the water bath located underneath the combustion chamber and intended for the wet ash, or into the conveying assemblies for the wet ash.

As disclosed, for example, in EP 0 615 518 B1, it is known to treat filter ashes for specific purposes. However, the wet ash, on account of its water content, presents some problems and therefore can be reused only to a limited extent, especially since the grain size is relatively large and fluctuates sharply.

SUMMARY OF THE INVENTION

It is, therefore, an object of the invention to provide a method which makes it possible to offer wider possibilities of use for some of the ash occurring hitherto in power stations as wet ash, without treatment involving a high outlay.

Contrary to the previous practice over many decades of conducting the open-pass ash into the water bath for wet ash or into the conveying conduit for wet ash, according to the invention the open-pass ash is intercepted when it is dry. If desirable, the open-pass ashes of a plurality of power station units can be combined by guiding the respective downpipes to a collecting silo.

In accordance with the present invention, the dry open-pass ash thus obtained is used (i) as raw material and fuel in cement production, (ii) as bed sand with combustible constituents in fluidized-bed firing, (iii) as a fuel carrier, or (iv) for the purpose of influencing sinterability in the production of sintered lightweight aggregates. Also, the mineral constituents can be separated from carbon-containing constituents capable of being employed as fuel or activated coke and used as fine sand.

BRIEF DESCRIPTION OF THE INVENTION

The accompanying FIGURE schematically shows a coal-firing plant adapted to permit the interception of open-pass ash.

DETAILED DESCRIPTION OF THE INVENTION

Open-pass ash has a grain-size distribution which ranges from virtually zero up to about 1 mm, but by far the greatest proportion of mineral constituents (generally more than 90%) is in the range between about 100 and 500 µm. It has also become clear with regard to the chemical composition that there is little fluctuation in open-pass ash. The mineral constituents of open-pass ash mainly include silica sand, in particular in the case of open-pass ash from lignite-fired plants, and small fractions of constituents containing aluminum, iron and calcium, which do not generally cause any problems in connection with the practice of the present invention. This applies, for example, when dry open-pass ash is used as such in cement production, in which the dry open-pass ash serves as raw material and fuel. However, the open-pass ash can first be subjected to magnetic separation if ferriferous constituents are likely to cause problems.

The bed sand required for fluidized-bed firing is a sand which a grain size of between 100 and 300 µm. Since appropriate screening is necessary when natural sand is used, natural sand is correspondingly expensive. In view of the grain-size distribution occurring in open-pass ash (generally about 70% in the range from 100 to 300 µm), it is preferable to use the open-pass ash as bed sand. In particular, in the state in which the open-pass ash is intercepted, a small grain fraction of particles with diameters less than 100 µm is discharged into the fly ash, while a likewise relatively small grain fraction of particles with sizes greater than 300 µm is drawn off together with other coarse grain. The fraction of coke particles can be used at the same time as fuel in the fluidized bed, unless the coke particles are to be employed as activated coke or as fuel in another way, in which case they can be, for example, separated off beforehand by screen separation to separate particles of at least about 500 µm or by pulsed air vibration separation. Sifting can also be carried out in such a way that a grain range of up to about 250 µm to 300 µm is separated off and is used as bed sand. The coarser grain fraction and, at least partially , the coke particles have thereby been removed.

In this case, a combination of screening and sifting may likewise be expedient, in order to produce, on the one hand, by screening and subsequent sifting, bed sand having the desired fine granulation of up to about 250 µm to 300 µm and, on the other hand, fuel of coarser granulation which can be used in the same connection. The bed sand and fuel can be metered jointly or separately.

Moreover, it is advantageous in this use of the open-pass ash as bed sand that the silica sand fraction of the open-pass ash, in view of the fact that it was subjected to high-temperature treatment during the combustion operation, is less abrasive than fine sand from a natural deposit because the grain is more rounded.

Open-pass ash as such can also be used in the production of lightweight aggregate, in which, for example, a mixture of fly ash and sewage sludge and/or paper sludge, which occurs in the reprocessing of waste-paper as a no longer usable residue, is employed. In this case, the open-pass ash serves as a further fuel carrier and influences the sinterability of the mixture, measured as a sintering characteristic number $$P = \frac{Fe_2O_3 + CaO + MgO}{SiO_2 + Al_2O_3}$$

Particularly during the combustion of lignite in dust fired plants, the open-pass ash can be divided by a separating cut (screening) at about 500 µm into a very low-coke and a high-coke fraction. In this case, burning losses BL of less than 0.5% to 1.5% can be achieved in the low-coke fraction, while high coke enrichment takes place in the coarse fraction.

The low-coke fraction thus obtained is preferably used as a fine-sand substitute or additive (many natural sands have fewer fine fractions than is desirable in terms of use), sand for the production of calcareous sandstone, of foam concrete and of mortar and bed sand in fluidized-bed firing (as already mentioned above). In these uses, small carbon fractions or small fractions of free CaO do not cause any problems, but may even be advantageous.

A separation of the mineral and coke fraction over the entire grain spectrum by sorting, in particular pulse air vibration separation, is also advantageous. The mineral fraction thus obtained can be used as a fine-sand substitute or additive (about 0 to 1 mm), for example in the production of lean concrete, concrete products, foam concrete, calcareous sandstones and mortar.

To produce a bed sand for fluidized-bed firing systems which exactly meets the requirements demanded there, the open-pass ash can also be sifted at about 300 μm, as mentioned above, and the fraction obtained thereby, containing fine sand of about 300 μm to 1000 μm and carbon particles, can, if appropriate, be separated initially into mineral and carbon particles and can be used as described above. The relative coarse fine sand obtained here can, if appropriate, also be ground and used in the production of porous building materials bound with calcium hydrosilicate.

If screening and pulsed air vibrating separation are connected in series, it is possible to obtain a mineral fraction with a particularly low carbon fraction which is suitable, for example, for the production of porous building materials bound with calcium hydrosilicate, dry mortars, etc. Coal dust which occurs can be used as fuel.

The FIGURE illustrates an example of a coal-fired power station, generally designated by reference numeral 100, from which open-pass ash suitable for use in the present invention can be obtained. In the station 100, coal is introduced from a feeder 102 into a combustion chamber 104, which is operated at a temperature sufficient to produce ash. For example, the combustion chamber 104 can operate at about 1100° C. From the combustion chamber 104, a portion of the ash is discharged via conduit 106, while the remaining portion is passed through cross pass 108 and open pass 110 to a pre-intermediate post cleaning apparatus 112. The ash is then passed to a droplet separator 114, which receives a limestone through conduit 116 and discharges a purified gas through conduit 118. Finally, a gypsum 120 is provided downstream from the droplet separator 114.

In the illustrated station 100, a portion of the ash passing through the cross pass 108 is removed and passed to a water container 122, where the ash is combined with boiler ash fed from conduit 124 before being passed to a wet ash bunker 126. Another portion of the ash is removed from the cleaning apparatus 112 and conveyed to a fly ash bunker 128, and thereafter conveyed to a mixer 130 where the ash is mixed with water. The wet ash discharged from the wet ash bunker 126 and mixer 130 are then combined for further processing. Contrary to conventional methods in which open-pass ash is conveyed into the water container (as shown by the broken line in the FIGURE), in the present invention the open-pass ash is intercepted when dry and conveyed to station 150 for further use.

We claim:

1. A method of producing cement from starting materials comprising open-pass ash obtained from a coal-fired plant or the like, said method comprising the steps of:

removing dry open-pass ash comprising mineral constituents and combustible constituents from at least one coal-fired plant or lignite-fired plant; and producing cement from starting materials comprising at least the mineral constituents of the dry open-pass ash, wherein more than 90% of the mineral constituents of the dry open-pass ash removed from the coal-fired plant or lignite-fired plant is in a range between about 100 μm and 500 μm, and wherein said mineral constituents include at least silica sand, aluminum, iron, and calcium.

2. A method according to claim 1, further comprising subjecting the dry open-pass ash removed from the coal-fired plant or lignite-fired plant to magnetic separation prior to said producing step.

3. A method according to claim 1, further comprising grinding the mineral constituents.

4. A method according to claim 1, further comprising employing the combustible constituents as a fuel in said step of producing cement.

5. A method of producing lightweight aggregate from starting materials comprising open-pass ash obtained from a coal-fired plant or the like, said method comprising the steps of:

removing dry open-pass ash comprising mineral constituents and combustible constituents from at least one coal-fired plant or lignite-fired plant;

producing lightweight aggregate from starting materials comprising at least the mineral constituents of the dry open-pass ash, where in more than 90% of the mineral constituents of the dry open-pass ash removed from the coal-fired plant or lignite-fired plant is in a range between about 100 μm and 500 μm, and wherein said mineral constituents include at least silica sand, aluminum, iron, and calcium.

6. A method according to claim 5, wherein said producing step further comprises mixing at least the mineral constituents of the dry open-pass ash with at least one member selected from the group consisting of fly ash, sewage sludge, and paper sludge.

7. A process according to claim 6, wherein the dry open-pass ash influences the sinterability of the mixture.

8. A process according to claim 5, wherein the dry open-pass ash serves as a fuel carrier.

9. A method according to claim 8, further comprising subjecting the dry open-pass ash removed from the coal-fired plant or lignite-fired plant to magnetic separation prior to said mixing step.

10. A method according to claim 5, further comprising grinding the mineral constituents.

11. A method according to claim 5, further comprising employing the combustible constituents as a fuel.

12. A method of preparing fuel or activated coke and fine sand from open-pass ash obtained from a coal-fired plant or the like, said method comprising the steps of:

removing dry open-pass ash comprising mineral constituents and combustible constituents from at least one coal-fired plant or lignite-fired plant;

separating the dry open-pass ash into the mineral constituents and the combustible constituents;

employing the combustible constituents as fuel or activated coke; and employing the mineral constituents as fine sand, wherein more than 90% of the mineral constituents of the dry open-pass ash removed from the coal-fired plant or lignite-fired plant is in a range between about 100 μm and 500 μm, and wherein said mineral constituents include at least silica sand, aluminum, iron, and calcium.

13. A method according to claim 12, further comprising grinding the mineral constituents into a fine sand and mixing with calcium hydrosilicate to produce porous building materials.

14. A method according to claim 12, further comprising subjecting the dry open-pass ash removed from the coal-fired plant or lignite-fired plant to magnetic separation.

15. A method according to claim 12, wherein said step of separating the dry open-pass ash into the mineral constituents and the combustible constituents comprises separating combustible particles greater than about 500 μm.

16. A method according to claim 15, wherein said step of separating combustible particles greater than about 500 μm is performed by screen separation.

* * * * *